Aug. 11, 1959  E. LAMMERZ  2,898,774
REVERSIBLE DRIVE SYSTEM
Filed Dec. 18, 1956
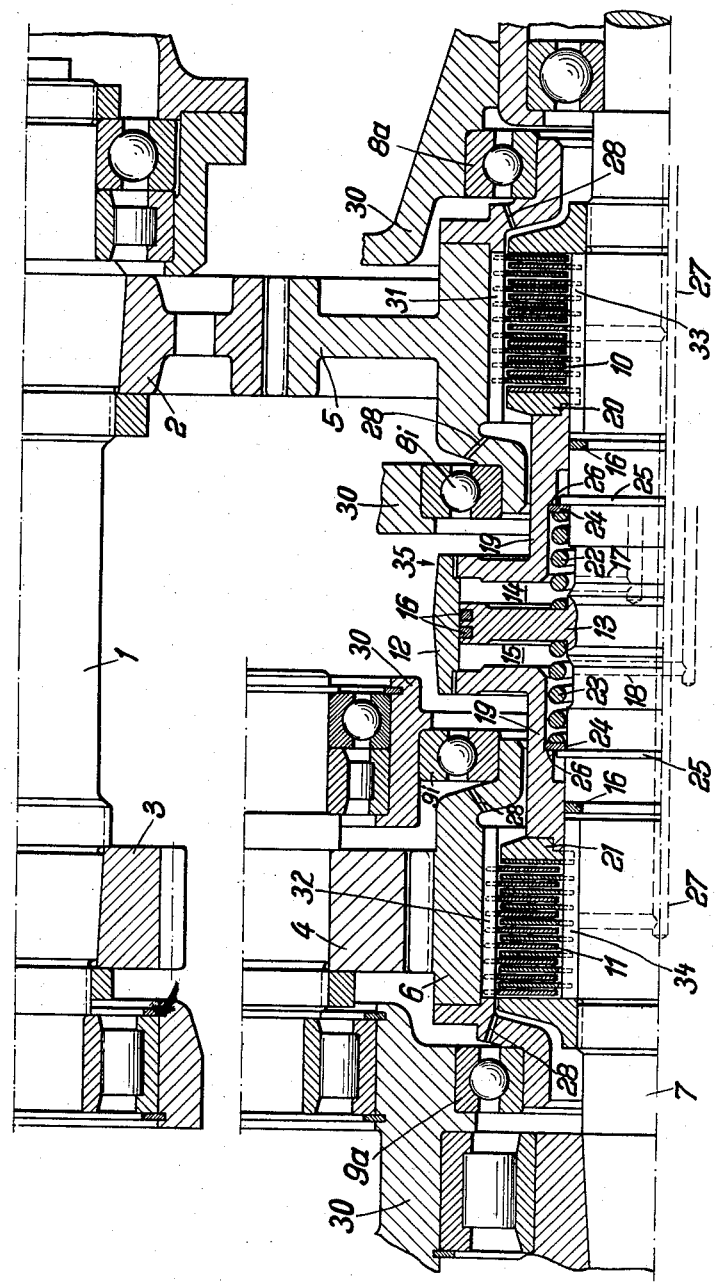
Inventor:
ERNST LAMMERZ
By Taulmin & Taulmin
Attorneys United States Patent Office 2,898,774
Patented Aug. 11, 1959

2,898,774

REVERSIBLE DRIVE SYSTEM

Ernst Lammerz, Essen, Germany, assignor to Aktiengesellschaft für Unternehmungen der Eisen- und Stahlindustrie, Essen, Germany Application December 18, 1956, Serial No. 629,100

Claims priority, application Germany December 22, 1955

12 Claims. (Cl. 74—377)

The present invention reluates to a system for reversing the direction of motion. More in particular, the present invention relates to a reversible clutch system, and still more particularly to a reversible gear drive connected with friction clutches, especially for use in diesel-hydraulically impelled rail vehicles such as, for instance, locomotives.

It is known in the art to combine reversible gear drives with toothed wheel or claw couplings. These reversing systems suffer, however, from the wellknown drawbacks generally adhering to toothed wheel or claw couplings. For example, the coupling elements of these clutches cannot be engaged, if the gears assume a position wherein the respective teeth of the driving and driven elements face each other instead of the teeth of one of these elements facing the interstices between two neighboring teeth of the other element.

In these known clutch systems, a release and subsequent reengagement of the gears must be avoided whenever the coupling gears are in motion relative to each other, lest serious damage be caused to the teeth of the gears.

It has therefore been suggested to equip reversible gear drives with friction clutches. However, while it is true that friction clutches do not suffer from the aforementioned drawbacks pertaining to toothed wheel and claw couplings, there are other considerations which have heretofore practically excluded the use of friction couplings in connection with reverse gears. Thus in reversing systems, particularly if employed for the purposes outlined above, it is paramount to provide for a construction permitting of the transmission of a comparatively great amount of power at a minimum of available space. The art has, however, not yet solved the problem of accomplishing the last mentioned effect and particularly when employing reversible gear drives connected with friction clutches for use in rail vehicles.

It is a general object of the present invention to provide for an improved motion reversing system eliminating all of the above enumerated drawbacks.

It is another general object of the present invention to provide for a motion reversing system which is easy to operate, sturdy, durable and operable regardless of the position of the gear elements.

It is a particular object of the present invention to provide for a reversible gear drive combined with a friction clutch arrangement in a motion reversing system, which system occupies a comparatively small space, while being capable to effect the transmission of a relatively great amount of power.

It is another particular object of the present invention to provide for a reversible gear drive combined with a friction clutch arrangement in a motion reversing system which suffers only from a minimum of wear of the elements of the system, and which is thus very economical.

These objects and advantages are achieved and the above mentioned drawbacks avoided by the reversible drive system of the invention, which comprises driving and driven transmission gears, in combination with friction clutch means, preferably of the multiple disk type, and a clutch shifting or switch member for engaging and disengaging the clutch means associated preferably with the driven shaft, and the gear drive, i.e. preferably the driven side of the latter.

According to an important feature of the invention, the driven gears of the gear drive are supported in the wall of the clutch casing and not on the driven shaft as is conventionally the case.

According to a further important feature of the invention, the switch member is axially displaceably mounted on the driven shaft. It comprises, for instance, a central portion forming a pressure cylinder in which a flange of the driven shaft is enclosed, which flange is devised to act as a piston; the switch member further comprises hub shaped or sleeve elements arranged at both sides of the aforesaid central portion and cooperating with friction couplings which are preferably arranged in a central cavity of the driven or secondary gears. The sleeve elements of the switch member may then both be disposed to extend between the driven shaft and the bearing for the driven gear housed in the clutch casing.

At the outward end of each hub shaped portion of the switch member, there is mounted a pressure plate for engagement of the respective inner end of the multiple disks of the multiple disk clutch arranged at that side of the pressure cylinder and underneath the driven gear.

Preferably, the axially movable switch member engages at its outer ends the gearings for the inner disks of the multiple disk clutches in such a manner that a rotation of the switch member relative to the shaft is prevented, which fact contributes to prevent an undue wear of the piston rings which seal the work spaces of the pressure cylinder against one another and the outside.

According to a preferred embodiment of the present invention the reversing system is provided with two preferably pre-tensioned and individually operative reset springs tending to hold the switch member in central position relative to the flange on the driven shaft. These reset springs are preferably mounted inside of the work spaces of the pressure cylinder. These springs assure a sufficient clearance of the gear, for example, in vehicle drive systems, from the vehicle axis as soon and as long as there is no pressure of the working fluid, for instance, due to arresting of the motor and the oil-pump driven by the latter.

The working fluid is conducted to and led off from the pressure cylinder, and the multiple disk assemblies are lubricated through corresponding longitudinal borings in the shaft. The lubricating oil leaving the multiple disk assembly can be conducted to the bearings of the casing of the respective corresponding gear through borings in the nave of the latter and thus effect an additional lubrication of the same.

The invention will be better understood and more fully appreciated by the following detailed description of the accompanying drawing, which is a longitudinal, sectional view of an embodiment of the invention showing a spur wheel reversible drive system.

Referring now to the drawing somewhat more in detail, upon the driving shaft 1 connected to the turbine of a Föttinger-Converter (not shown), there are mounted two toothed gears 2 and 3, of which gear 2 is directly in permanent engagement with toothed gear 5 while gear 3 is in engagement with gear 6 via an intermediary gear 4. The toothed gears 5 and 6 consequently always have an opposite direction of rotation and can be coaxially and alternatingly coupled with the driven shaft 7 which is arranged centrally and axially passing through both. However, these gears 5 and 6 are not borne by this shaft; they are journalled at the wall of the drive casing 30; each of the gears 5 and 6 being supported by a pair of rolling contact bearings such as roller or ball bearings 8a, 8i and 9a, 9i, respectively. Inside a central bore of each of gears 5 and 6, and between the aforesaid two bearings of each gear, multiple disk clutches 10 and 11 respectively, are arranged; the exterior disk parcel of each clutch is mounted in the hub bore 31, 32 of the respective toothed gear, whereas the interior disk parcel is guided in corresponding longitudinal grooves, 33, 34, of shaft 7.

A common shifting or switch member 35 for engaging at will one or the other of the two multiple disk clutches 10, 11, comprises a pressure cylinder 12 as its central portion located centrally between gears 5 and 6. This cylinder 12 houses a flange 13 of shaft 7, which flange acts as a piston being axially displaceable in cylinder 12; the two work spaces 14 and 15 thus formed in the pressure cylinder 12 on both sides of this flange, and sealed from the outside and against the internal wall of cylinder 12 by piston rings 16, can be alternatingly subjected to pressure of a working fluid which is admitted or withdrawn through bores 17 and 18 respectively provided in shaft 7. The switch member 35 is connected on both sides of pressure cylinder 12 to pressure plates 20 and 21 respectively of the inner multiple disk assemblies of clutches 10, 11 respectively, via hub-shaped portions 19, arranged underneath inwardly positioned bearings 8i, 9i of toothed gear 5 and 6 respectively. These pressure plates 20, 21 are geared in the same way as the inner desk assemblies and are guided in the same manner as these disks in the corresponding longitudinal grooves 33, 34 of shaft 7, so that the switch member can only be displaced axially relative to the shaft 7.

In order to reset the switch member to its central position in the absence of oil pressure in chambers 14 or 15, two helical pressure springs 22 and 23, are arranged within the work spaces 14 and 15 respectively of pressure cylinder 12, and which, in the central position of the latter shown in the drawing, are pre-tensioned and supported by the flange 13 on the one hand and by the rings 24, on the other hand, the latter being pressed, in turn, against collars 25 provided on the shaft 7 and concurrently against annular shoulders 26 formed in the interior wall of the hub-shaped portions 19 of the switch member 35.

An additional bore 27 is provided in shaft 7 for conducting lubricating oil to the multiple disk assemblies of friction clutches 10 and 11. After having flown through the multiple disk assemblies, the lubricating oil is conducted to the ball bearings 8a, 8i and 9a, 9i of gears 5 and 6, and further on, through bores 28 provided in the hubs of these gears, and thus effects a supplemental lubrication of the latter.

If, for example, starting from the central position of the reverse gear as illustrated, in which position there is no engagement between shaft 7 and gears 5 and 6, toothed gear 5 is to be engaged via the multiple disk clutch 10, the work space 14 of the pressure cylinder 12 is subjected to pressure by the working fluid through bore 17, and pressure from work space 15 is released through the bore 18. As soon as the pressure within the work space 14 exceeds the counter pressure of the tensioned spring 23 in the work space 15, the switch member composed of the elements 12, 19, 20, 21 is moved to the right along shaft 7, whereupon the spring 23 is compressed by the corresponding support ring 24, the latter being also moved to the right by the annular shoulder 26, whereas spring 22 remains in its resting position or is further relieved, if pretensioned. The inner multiple disk parcel of clutch 10 is thus pressed by pressure plate 20 against the outer disk parcel and thereby the clutch is engaged, and shaft 7 driven via gears 2 and 5. The engagement of the other multiple disk clutch 11 is effected in a corresponding manner, by pressurizing chamber 15 and relieving chamber 14 of pressure. Shaft 7 is then driven, in opposite direction, from driving shaft 2 via gear 3, intermediary gear 4 and secondary gear 6.

It will be understood that this invention is susceptible to modification in order to adapt it to different usages and conditions, and, accordingly, it is desired to comprehend such modifications within this invention as may fall within the scope of the appended claims.

What I claim is:

1. A reversing gear system comprising, in combination, a casing, a driving shaft, a first pair of toothed gears, mounted upon said driving shaft, an intermediate gear engaging one gear of said first pair of toothed gears, a second pair of toothed gears, rolling contact bearing means freely rotatably supporting said second pair of toothed gears in the wall of said casing, one gear of said second pair of toothed gears engaging one of the toothed gears of said first pair of toothed gears, the other gear of said second pair of toothed gears engaging said intermediate gear, the gears of said second pair of toothed gears thus rotating in opposite directions relative to each other, a reversibly rotatable driven shaft, said second pair of toothed gears being journalled around said reversing gear shaft, a pair of clutch assemblies each associated with one gear of said second pair of toothed gears, respectively, a switch member effecting the engagement and disengagement, respectively, of each of said clutch assemblies with its associated toothed gears so as to couple said reversing gear shaft with said driving shaft for rotation in either direction or to uncouple said reversing gear shaft from said driving shaft.

2. In a reversing gear system as described in claim 1, said switch member comprising a central portion, two opposedly extending portions and two end portions, said central portion being formed as a pressure cylinder, a flange-shaped piston upon said reversing gear shaft, said cylinder enclosing said piston, said opposedly extending portions being hub-shaped, said hub-shaped portions being arranged at least partly inside said rolling contact bearing means, said end portions each consisting of a pressure plate which is connected to one side of said clutch assemblies.

3. A reversing gear system comprising, in combination, a casing, a driving shaft, a first pair of toothed gears, mounted upon said driving shaft, an intermediate gear engaging one gear of said first pair of toothed gears, a second pair of toothed gears, one gear of which second pair engages one gear of said first pair of toothed gears, the other gear of said second pair of toothed gears engaging said intermediate gear, the gears of said second pair of toothed gears thus rotating in opposite directions relative to each other, rolling contact bearings freely rotatably supporting said second pair of toothed gears in the wall of said casing, a reversibly rotatable driven shaft, a pair of multiple disk clutch assemblies each associated with one gear of said second pair of toothed gears, respectively, a switch member comprising a central portion, two oppositely extending portions and two end portions, said central portion being formed as a pressure cylinder, a flange-shaped piston, said cylinder enclosing said piston upon said reversing gear shaft, said end portions each consisting of a pressure plate, said pressure plates adjoining the respective inner sides of said multiple disk clutch assemblies, said switch member effecting the engagement and disengagement, respectively, of one of said multiple disk assemblies with one of said toothed gears of said second pair of toothed gears for thus coupling or uncoupling said reversing gear shaft with said driving shaft.

4. A reversing gear system as described in claim 3, wherein said reversing gear shaft is provided with longitudinal borings, the lubricant for lubricating said pressure cylinder and said multiple disk clutch assemblies being conveyed through said longitudinal borings, and wherein each gear of said second pair of toothed gears is provided with an axial bore in its hub portion, and with borings from said axial bore through said hub portion to the outside thereof, each of the oppositely extending portions of said switch member being at least partly inserted into one of said axial bores, the lubricant leaving said multiple disk clutch assemblies being conducted through said borings to said rolling contact bearings.

5. A reversing gear system comprising, in combination, a reversing gear shaft, a casing, two toothed gears journalled around said reversing gear shaft, each of said toothed gears having a hub portion and an axially extending bore therein, a driving shaft drivingly connected to said two toothed gears in such a manner that said gears will rotate in opposite directions relative to each other, two couples of rolling contact bearings each couple freely rotatably supporting one of said toothed gears, respectively, in the wall of said casing, two multiple disk clutch assemblies each associated with one of said toothed gears, respectively, a switch member comprising a central portion, two oppositely extending hub-shaped portions and two end portions, said central portion being formed as a pressure cylinder, a flange-shaped piston, said cylinder enclosing said piston upon said reversing gear shaft, said hub-shaped portions of said switch member being arranged at least partly inside said bores in said toothed-gear hub portions, said end portions each consisting of a pressure plate, said pressure plates adjoining the respective inner sides of said multiple disk clutch assemblies, said switch member effecting the engagement and disengagement, respectively, of one of said multiple disk assemblies with one of said toothed gears to thus coupling for rotation in the desired sense, or uncoupling said reversing gear shaft with said driving shaft.

6. A reversing gear system comprising, in combination, a reversing gear shaft, two toothed gears the hub portions of which surround said reversing gear shaft, a driving shaft drivingly connected to said two toothed gears in such a manner that said gears will rotate in opposite directions relative to each other, a casing, two couples of rolling contact bearings each couple supporting both ends of said hub portion of one of said toothed gears, respectively, in the wall of said casing, two multiple disk clutch assemblies each associated with and arranged between said hub portion of one of said toothed gears, respectively, and said reversing gear shaft, a switch member arranged on said reversing gear shaft and comprising a central portion, two oppositely extending portions and two end portions, said central portion being formed as a pressure cylinder, a flange-shaped piston, said cylinder enclosing said piston upon said reversing gear shaft, said oppositely extending portions being hub-shaped, said hub-shaped portions being arranged inside one end of said hub portions of said toothed gears, said end portions each consisting of a pressure plate, said pressure plates adjoining the respective inner sides of said multiple disk clutch assemblies, said switch member effecting the engagement and disengagement, respectively, of one of said multiple disk assemblies with one of said toothed gears thus coupling or uncoupling said reversing gear shaft with said driving shaft.

7. A reversing gear system as described in claim 6 wherein said reversing gear shaft is provided with longitudinal grooves, the interior disks of said multiple disk clutch assemblies and said pressure plates being guided in said longitudinal grooves, said switch member thus being movable only in an axial direction with respect to said reversing gear shaft.

8. A reversing gear system as described in claim 6, comprising two pre-tensioned reset springs mounted within said pressure cylinder on both sides of said piston and pressing thereagainst thus biasing said switch member in its central position.

9. A reversing gear system as described in claim 6, wherein said reversing gear shaft is provided with longitudinal borings, the lubricant for lubricating said pressure cylinder and said multiple disk clutch assemblies being conveyed through said longitudinal borings.

10. A reversing gear system as described in claim 6, wherein said reversing gear shaft is provided with longitudinal borings, the lubricant for lubricating said pressure cylinder and said multiple disk clutch assemblies being conveyed through said longitudinal borings, and wherein each gear of said pair of toothed gears is provided with borings in its hub portion, the lubricant leaving said multiple disk clutch assemblies being conducted through said borings to said rolling contact bearings.

11. A reversing system comprising, in combination, a casing, two toothed gears in axial alignment with each other and freely rotatably supported in the well of said casing, each of said toothed gears having a hub portion and an axially extending bore therein, a driving shaft drivingly connected to said two toothed gears in such a manner that said gears will rotate in opposite direction, a reversibly rotatable driven shaft in axial alignment with and at least partially intermediate said two toothed gears, two friction clutches each comprising a first part associated with one of said toothed gears, and a second part associated with said driven shaft and adapted for engaging one at a time of said two toothed gears, and shifting means displaceably mounted on the portion of said shaft intermediate said two toothed gears and adapted for being displaced from a neutral position intermediate the latter in which said clutches are disengaged, toward one of said toothed gears, thereby bringing about engagement of the first and second parts of the clutch associated with the respective toothed gear and, consequently, rotation of said driven shaft in the desired direction.

12. A reversing system comprising, in combination, a casing, two toothed gears in axial alignment with each other and freely rotatably supported in the well of said casing, each of said toothed gears having a hub portion and an axially extending bore therein, a driving shaft drivingly connected to said two toothed gears in such a manner that said gears will rotate in opposite direction, a reversibly rotatable driven shaft in axial alignment with and at least partially intermediate said two toothed gears, two friction clutches each comprising a first part associated with one of said toothed gears, and a second part associated with said driven shaft and adapted for engaging one at a time of said two toothed gears, and shifting means displaceably mounted on the portion of said shaft intermediate said two toothed gears and adapted for being displaced from a neutral position intermediate the latter in which said clutches are disengaged, toward one of said toothed gears, thereby bringing about engagement of the first and second parts of the clutch associated with the respective toothed gear and, consequently, rotation of said driven shaft in the desired direction, hydraulic means effecting the displacement of said shifting means toward one of said toothed gears, and spring means for automatically returning said shifting means to neutral position, when said hydraulic means are inoperative.

References Cited in the file of this patent
UNITED STATES PATENTS

| | | |
|---|---|---|
| 2,464,538 | Vanderzee | Mar. 15, 1949 |
| 2,600,043 | Armitage et al. | June 10, 1952 |
| 2,632,544 | Hockert | Mar. 24, 1953 |